Figure 1:
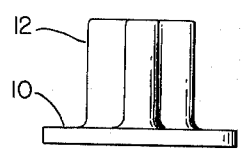

Oct. 18, 1955  E. A. BESSOM  2,720,905
RESILIENT SHEET METAL LOCK NUT
Filed Dec. 10, 1952

INVENTOR.
EARL A. BESSOM
BY
Kenway, Jenney, Witter & Hildreth
ATTORNEYS

United States Patent Office 2,720,905
Patented Oct. 18, 1955

2,720,905
RESILIENT SHEET METAL LOCK NUT

Earl A. Bessom, Marblehead, Mass., assignor, by mesne assignments, to Con-Torq Inc., Salem, Mass., a corporation of Massachusetts Application December 10, 1952, Serial No. 325,150

1 Claim. (Cl. 151—21)

This invention relates to resilient sheet metal lock nuts and more particularly comprises an improved lock nut of the nature shown in Patent 2,279,388 to Joseph F. Cox. That nut has an annular base flange and an annular barrel integral therewith at its inner margin and extending outwardly from one face of the flange. The barrel comprises a plurality of radially expansible arcuate segments threaded internally and connected at their ends by resilient U-shaped loops extending radially outwardly of the barrel. After the nut body is formed and tapped the segments are closed or set inwardly toward the axis of the barrel to reduce the effective diameter of the barrel thereby effecting a gripping action on a bolt to which the nut is applied.

In the Cox nut the segments are closed inwardly without appreciably changing their radius of curvature and as a result, as hereinafter more specifically described, the junction of each segment with the adjacent connecting loops is forced inwardly to a point substantially within the circle of the pitch diameter of the thread. Accordingly when the nut is screwed on a bolt these angular points of junction bite into the bolt and the pressure effecting this bite becomes so great that the bolt threads are thereby abraded and impaired. Removal and replacement of the nut on the bolt with constant torque is thereby made impossible.

The primary object of my invention is to produce an improved lock nut which wholly eliminates this difficulty and renders the nut applicable to the bolt and removable therefrom and replaceable thereon repeatedly without damage to the threads of the bolt and with constant torque.

These desirable results I have discovered may be achieved by imparting to the threaded segments of the barrel a specific and special shape such that the angular points of junction at both ends of each threaded segment are initially located outside the pitch diameter of the thread as originally formed. This requires a fundamental departure from the construction disclosed in the Cox patent. Instead of preserving the radius of curvature of the threaded segments I now substantially flatten the segments in the closing-in operation, that is to say, the curvature is altered and made such that as the bolt is inserted it contacts first with the center of each segment. As the nut is fully screwed on the bolt the segments are modified in their curvature and in effect are wrapped resiliently about the bolt, but at no stage are the points of juncture brought inside the pitch circle of the bolt. Never, throughout the application or removal of the nut is there any tendency or possibility of scoring or damaging the threads of the bolt.

These and other features of the invention will be best understood and appreciated from the following description of a preferred embodiment thereof selected for purposes of illustration and shown in the accompanying drawings in which—

Figure 2:
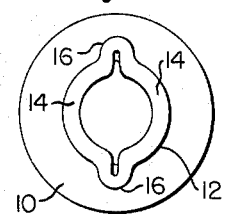
Figure 3:
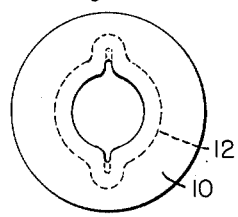
Figure 4:
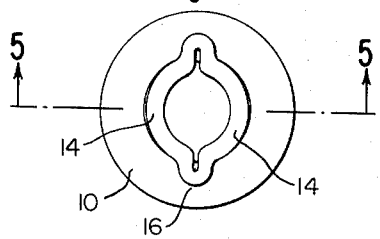
Figure 5:
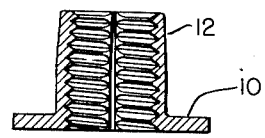
Figure 6:
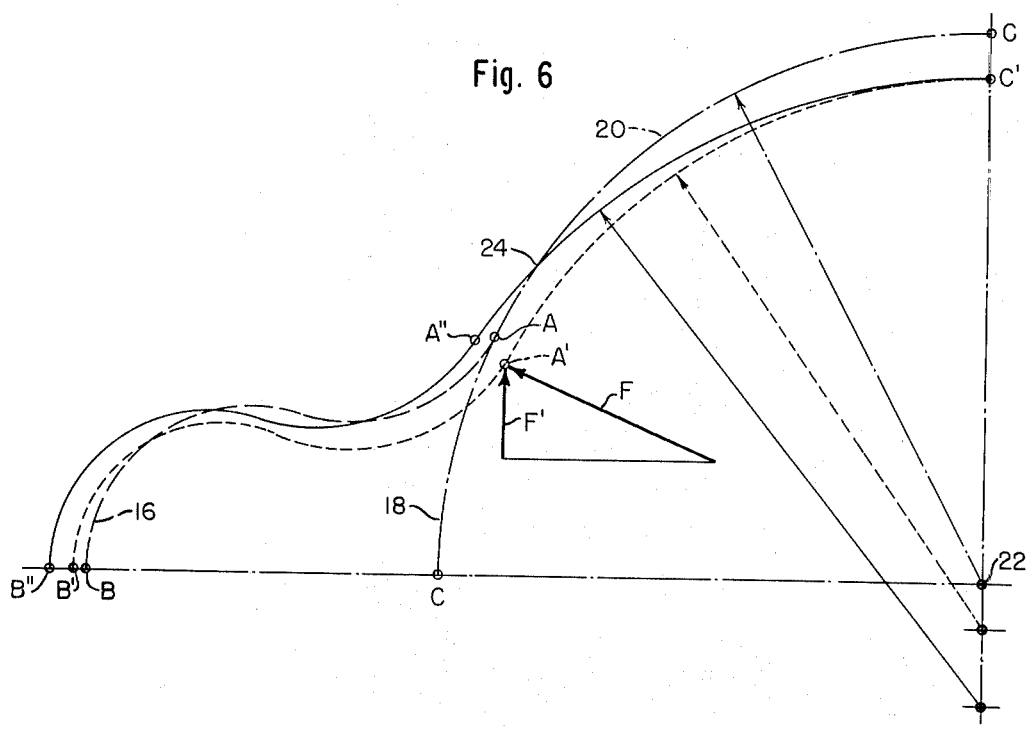

Figs. 1, 2 and 3 are side, top and bottom views of the nut as originally formed and tapped, Fig. 4 is a top plan view of the nut, showing its segments closed in and flattened, Fig. 5 is a sectional view taken on line 5—5 of Fig. 4, and Fig. 6 is a graphic view showing on an enlarged scale the thread pitch line of one half portion of one of the segments of the nut of Figs. 4 and 5, together with the adjacent half of a connecting loop of the nut, taken near the top end of the barrel, a like line showing the setting of the Cox nut, and a like line showing the nut before setting, all together with the normal thread pitch line of a cooperating bolt.

The nut body comprises a single piece of sheet steel or other metal embodying a flat annular base flange 10 having a barrel 12 integral therewith at its inner margin and extending outwardly from one face of the flange. The barrel comprises a plurality of radially expansible arcuate segments 14 threaded internally and connected at their ends by U-shaped loops 16 extending radially outwardly of the barrel. The nut body can be produced by conventional drawing methods up to the point of tapping as described in the Cox patent. After the nut body is formed and tapped the segments are flattened and closed inwardly toward the axis of the barrel to reduce the effective diameter of the barrel, as illustrated in Figs. 4 and 5. As will be apparent from Fig. 5 of the drawing, the inward setting of the barrel increases progressively from zero at the flange 10 to a maximum at the top end of the barrel and, due to this structure, the degree of outward yield of the segments 14 increases progressively and attains a predetermined maximum toward the top end of the barrel when the nut is threaded onto a bolt. The base or flange of the nut provides a non-yieldable lower end portion incapable of appreciable expansion.

The inward setting and shaping of the segments 14 is effected by suitable dies effective to contract the side walls or segments 14 of the barrel to a predetermined setting. Such setting is illustrated in Fig. 6 of the drawing and will now be described. As herein shown the segments 14 are each slightly less than 180° in their circumferential length and are connected with the loops 16 through intermediate portions of short radius curvature. Each of the loops includes a curvature of at least 180° this being necessary to give the loops full resilient play.

The thread pitch line C—C of a bolt corresponding to the nut is indicated by reference character 18 in Fig. 6. The line B A C is the center line of the upper left hand quadrant of a segment 14 near the top end of the barrel before the shaping and setting operation and the thread pitch line A—C of the nut before setting is indicated by reference character 20. It will be apparent that the lines 18 and 20 coincide and are at a constant distance from the center of the nut in its stage of production before setting. When the nut in this stage is subjected to the closing in or setting operation without appreciably changing the radius of curvature, the center line B A C is moved to the position indicated by line B′ A′ C′. The inward setting is at a maximum at C—C′ and the radial distance C—C′ is somewhat greater than the distance A—A′, both points A′ and C′ and the line therebetween being brought within the threaded pitch line C—C.

When a nut which has been thus distorted inwardly, as represented by the line B′ A′ C′, is screwed onto a bolt to a position where it starts to expand the segments, the first contact will be at C′ where the radius of the nut is the least relative to that of the bolt. The force applied at C′ creates a moment around a point adjacent A′ which in turn creates a moment around a point adjacent B′. This causes a bending around the two points adjacent A′ and B′ until the line C′—A′ becomes approximately parallel to C—C. This expanding and bending force applied at C′ continues to leave the nut at A′ in pressure contact with the bolt at a distance from the center 22 of the bolt less than the radius of the bolt. Further threading on of the nut creates a radial pressure approximately at A' to force the segment wall outwardly until the line A'—C' coincides with the line C—C. This outward force or pressure exerted by the screw in the direction of the arrow F is several times the magnitude of F' which is that force necessary to produce a moment around the point adjacent B' in order to carry that portion of the nut adjacent A' outwardly, away from the center 22 until it meets the line C—C. This effect is, of course, amplified by the action in all four quadrants of the nut. In practice, this pressure becomes so great that the threads are scored and impaired.

In accordance with the present invention, the barrel 12 is shaped in a die having a radius of curvature appreciably greater than that of the circle of the pitch diameter of the thread of the barrel so that the segments 14 are bent inwardly toward the axis of the barrel in progressively increasing degree from the base 10 to the top end of the barrel and the radius of the curvature of the segments as thus set progressively increases from the base to the top end of the barrel.

This setting forces the radially outwardly formed loops 16 away from the center 22 of the barrel to points B'' (Fig. 6) in a manner carrying the juncture points A'' of the segments with the loops to a position outside the original position A thereof, while the greater portion of each segment extending through the point C' is disposed inside of its original position A—C. As illustrated in Fig. 6, each segment is bent inwardly of the normal pitch circle A—C of the thread toward the axis of the barrel a maximum amount at points C' midway between the adjacent loops, with each segment progressively approaching said circle of normal pitch diameter from its said midway point circumferentially of the barrel in both directions to points 24 coinciding with the normal circle 20 of pitch diameter adjacent to the junctions with the adjacent loops whereby the radius of curvature of each segment from the center 22 of the barrel is a minimum at said midway point and progressively increases therefrom circumferentially of the barrel in both directions, the points of juncture A'' of the threaded segments with the loops lying always outside the said circle of pitch diameter. As also illustrated in Fig. 6, the segments are bent to coincide with the normal pitch circle at points 24 short of said junctions and thereafter progressively to depart radially outwardly from the normal pitch circle toward said junctions.

When a nut thus set is applied to a bolt the flange or base end of the nut enters freely for a turn or two, then produces pressure on the nut radially at some point along a line from C' to the base. This force produces a bending moment around the point adjacent A'' which in turn produces a bending moment around the point adjacent B''. As the nut is screwed further onto the bolt the portion adjacent C' is forced outwardly toward C until the nut is completely threaded on the bolt and causes C' to coincide with C, A'' to coincide with A, and B'' to approach B.

The arm C'—A'' is of greater radius than the arc C—C and, the sgments being flexible, the spring reaction of the loop A''—B'' together with the opposing like action of its mate on the opposite side of the nut causes the threaded arcuate section to bend or wrap around the thread of the bolt to a complementary fit. During this movement the loops 16 act as C-shaped springs to control the pressure of the nut segments against the bolt and thus function together with the spring action of the segments, due to their predetermined setting, finally to engage the nut thread into a perfect fitting engagement with the bolt thread.

Having thus disclosed my invention what I claim as new and desire to secure by Letters Patent is:

A one-piece lock nut comprising a base flange and an upstanding barrel having a plurality of radially expansible arcuate resilient segments of substantially 180° in circumferential length, threaded internally and connected at their ends from top to bottom through intermediate portions of short radius curvature to resilient U-shaped loops each of which extends outwardly of the barrel and is at least 180° in curvature, the threads of the segments being closed inwardly with respect to the circle of normal pitch diameter of the thread toward the axis of the barrel a maximum amount midway between the adjacent loops, each segment progressively increasing in radius from its midway point circumferentially in both directions and forming junctures with said U-shaped loops at points outside the said circle of pitch diameter, thereby, when the nut is applied to a threaded bolt, the bolt first contacts the central portion of each segment forcing said central portion outwardly and drawing inwardly the portions of each segment adjacent the loops, thus causing the threads of each segment to wrap around the bolt in a complementary fit without biting into the bolt threads and develop uniform torque in repeated applications to the bolt.

References Cited in the file of this patent
UNITED STATES PATENTS

| | | |
|---|---|---|
| 2,279,388 | Cox | Apr. 14, 1942 |
| 2,563,162 | Eckenbeck | Aug. 7, 1951 |